United States Patent
Chen et al.

(10) Patent No.: US 6,460,649 B2
(45) Date of Patent: Oct. 8, 2002

(54) PASSIVE STARTING OF A TORQUE-RIPPLE-FREE ELECTRIC POWER STEERING SYSTEM

(75) Inventors: Shaotang Chen; David W. Graber, both of Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/784,957

(22) Filed: Feb. 16, 2001

(65) Prior Publication Data

US 2002/0112913 A1 Aug. 22, 2002

(51) Int. Cl.⁷ .............................................. B62D 5/04
(52) U.S. Cl. ...................................... 180/443; 180/446
(58) Field of Search ............................... 318/443, 489, 318/727, 567, 569, 600, 432, 434; 180/443, 446

(56) References Cited

U.S. PATENT DOCUMENTS

| | | | |
|---|---|---|---|
| 4,122,478 A | 10/1978 | Gallo et al. | |
| 4,599,561 A | 7/1986 | Takahaski et al. | |
| 4,678,973 A | 7/1987 | Elliott et al. | 318/254 |
| 4,794,536 A | 12/1988 | Eto et al. | |
| 5,065,324 A | 11/1991 | Oshita et al. | |
| 5,144,564 A | 9/1992 | Naidu et al. | 364/494 |
| 5,177,417 A | 1/1993 | Lee et al. | 318/254 |
| 5,203,420 A | 4/1993 | Shiraishi | |
| 5,283,741 A | 2/1994 | Desrus | |
| 5,397,972 A | 3/1995 | Maiocchi | 318/439 |
| 5,521,475 A | 5/1996 | Fu et al. | |
| 5,739,969 A | 4/1998 | Garza | |
| 5,791,432 A | 8/1998 | Fushimi et al. | |
| 5,892,339 A * | 4/1999 | Park et al. | 318/254 |
| 5,898,301 A | 4/1999 | La Croix et al. | |
| 6,014,348 A * | 1/2000 | Kim | 369/13 |
| 6,079,513 A | 6/2000 | Nishizaki et al. | |
| 6,329,782 B1 * | 12/2001 | Chen et al. | 318/727 |

OTHER PUBLICATIONS

Materials downloaded from web under hyperphysics.phy.astr.gsu.edu and mag–net.ee.unist.ac.uk.

* cited by examiner

*Primary Examiner*—Anne Marie Boehler
*Assistant Examiner*—Tony Winner
(74) *Attorney, Agent, or Firm*—Edmund P. Anderson

(57) ABSTRACT

A method for passively starting an electric power steering ("EPS") system includes disabling assist torque upon power-up, detecting an index pulse upon a movement of a steering column across one of a plurality of reference positions, enabling assist torque for the EPS system upon detecting the index pulse, receiving a variable input torque command indicative of an external steering input, and ramping a variable assist motor torque towards the variable input torque command after enabling assist torque for the EPS system until the variable assist torque is substantially equal to the variable input torque command; wherein an EPS system apparatus includes a steering wheel for receiving operator inputs coupled to a steering column, a motor coupled to the steering column for applying torque assist to the column, an encoder coupled to the motor for determining the angular displacement of the steering column where the encoder comprises at least one track and a set of sensors for sensing the at least one track to generate a set of signals, a controller connected in signal communication between the encoder and the motor for receiving the set of signals from the encoder and controlling the motor in correspondence with a method for passively starting the electric power steering system, the controller comprising an index pulse detector, an enabler responsive to the index pulse detector for enabling an amplifier, and an amplifier for ramping the variable assist torque in correspondence with a variable input torque command.

18 Claims, 4 Drawing Sheets

PASSIVE STARTING OF A TORQUE-RIPPLE-FREE ELECTRIC POWER STEERING SYSTEM

TECHNICAL FIELD

This disclosure relates to passive starting strategies, and more particularly, to passive starting strategies for a Torque-Ripple-Free Electric Power Steering system.

BACKGROUND

Electric power steering ("EPS") has been the subject of development by auto manufacturers and suppliers for over a decade, due in part to its potential advantages of fuel economy and ease-of-control when compared with traditional hydraulic power steering ("HPS"). However, commercialization of EPS systems has been slow and is presently limited due to cost and performance challenges. Among the most challenging technical issues are the pulsating feel at the steering wheel and the audible noise associated with the type of high performance electric drives needed to meet steering requirements.

Despite the relatively low levels of torque ripple and noise of EPS systems using conventional PM brushless motors, they are no match to the smoothness and quietness of HPS, with its long history of performance refinement efforts. Consumers are reluctant to compromise the refined features of HPS. Several performance and cost issues have stood in the way of broad-based EPS commercialization regardless of the technology used.

Upon power-up of a typical EPS system, it is generally impossible to determine the rotor position of the EPS motor by using incremental encoder signals until the motor is moved across an index position for the first time. Thus, until the EPS motor crosses the index position, the motor position is estimated by using three additional low-resolution commutation sensors to provide initial position information.

In an EPS system, it is desirable to reduce the size and cost of the encoder and sensors. The typical encoding scheme uses at least one encoding track for each of two high-resolution quadrature pulse-trains. In addition, at least three tracks are used foe low-resolution commutation sensor signals, which are used for position estimation. It is desirable to reduce the size and cost of the encoder by reducing the number of tracks required on the encoder.

Typically, the commutation sensors in an EPS system are used only once, immediately following EPS system power-up. The commutation sensors provide some information that helps to provide an assisted torque for starting an EPS motor until the rotor reaches an indexed position. Once the EPS system is synchronized to the indexed position, precise position information becomes available and the commutation sensors are no longer needed. Various methods for starting PM motor drives have certain limitations, such as either the limitation of:causing the EPS motor to rotate in an arbitrary direction before it locks to the index pulse or the limitation of requiring the use of current sensors and complicated algorithms. It is desirable to provide a method for starting a torque-ripple-free ("TRF") EPS system that would preferably operate without costly and generally inaccurate commutation sensors, and which would preferably eradicate the sources of torque-ripple under ideal conditions, as well as reduce the noise level of the TRF EPS system.

SUMMARY

The above discussed and other drawbacks and deficiencies of the prior art are overcome or alleviated by a method for passively starting an electric power steering ("EPS") system.

In an exemplary embodiment, a method for passively starting an EPS system includes disabling assist torque upon power-up, detecting an index pulse upon a movement of a steering column across one of a plurality of reference positions, enabling assist torque for the EPS system upon detecting the index pulse, receiving a variable input torque command indicative of an external steering input, and ramping a variable assist motor torque towards the variable input torque command after enabling assist torque for the EPS system, until the variable assist torque is substantially equal to the variable input torque command.

An exemplary EPS system apparatus includes a steering wheel for receiving operator inputs coupled to a steering column, a motor coupled to the steering column for applying torque assist to the column, an encoder coupled to the motor for determining the angular displacement of the steering column where the encoder comprises at least one track (e.g., two tracks) and a set of sensors for sensing the at least one track to generate a set of signals, a controller connected in signal communication between the encoder and the motor for receiving the set of signals from the encoder and controlling the motor in correspondence with a method for passively starting the electric power steering system. The controller comprises an index pulse detector, an enabler responsive to the index pulse detector for enabling an amplifier, and an amplifier for ramping the variable assist torque in correspondence with a variable input torque command. The variable input torque command may correspond to an operator input or to an automatic control signal, such as for hands-free operation.

BRIEF DESCRIPTION OF THE DRAWINGS

A torque-ripple-free electric power steering system ("TRF EPS") will now be described by way of example with reference to the accompanying drawings, in which.

DESCRIPTION OF AN EMBODIMENT

A torque-ripple-free ("TRF") electric power steering ("EPS") system includes a slot-less permanent magnet ("PM") machine with a sinusoidal back-EMF ("sinusoidal motor") and an electronic sinusoidal controller for supplying a sinusoidal current in synchronization with the back-EMF waveform.

Figure 1:
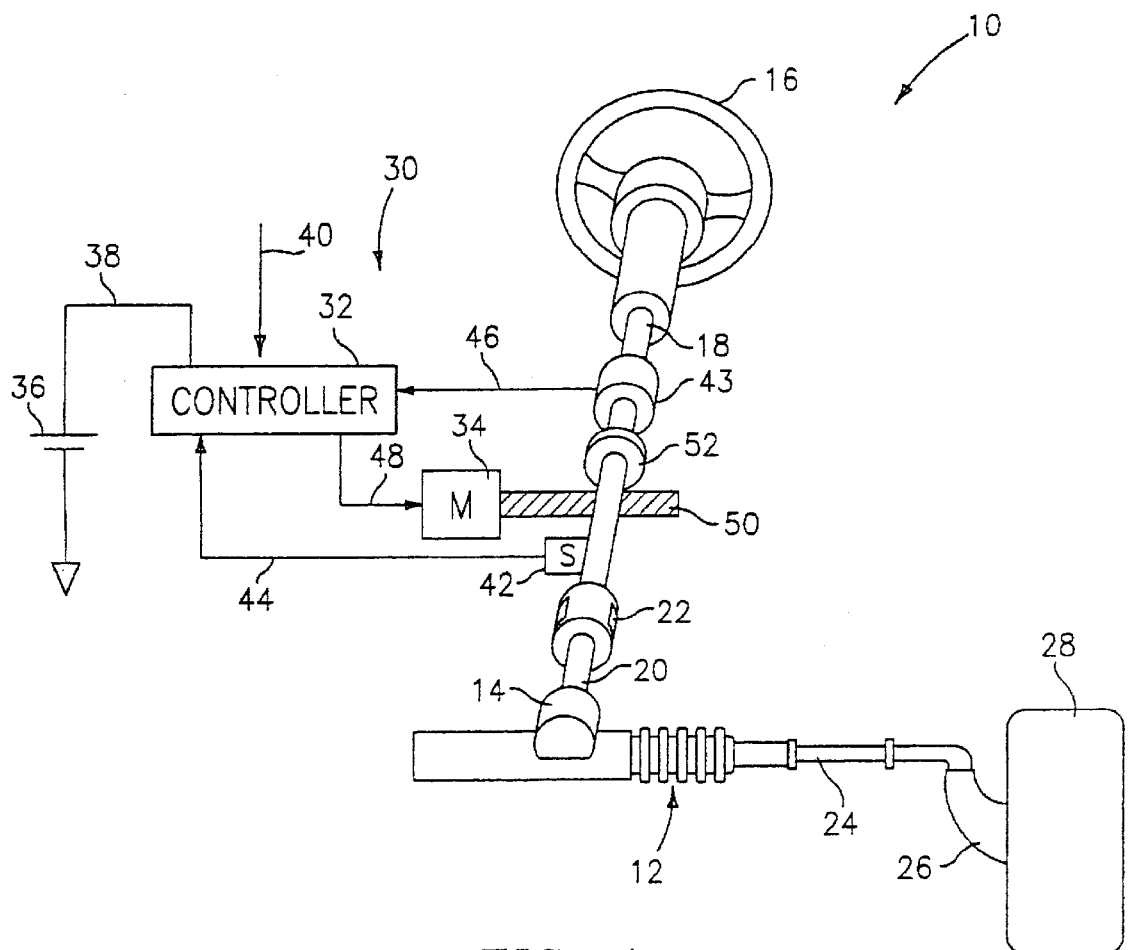
FIG. 1 illustrates a schematic diagram of a TRF EPS system.

Referring to FIG. 1, reference numeral 10 generally designates a TRF EPS system for a motor vehicle. A steering mechanism 12 is a rack-and-pinion type mechanism that includes a toothed rack (not shown) and a pinion gear (also not shown) located under a gear housing 14. A steering wheel 16 is coupled to an upper steering shaft 18. As the steering wheel 16 is turned, the upper steering shaft 18, which is connected to a lower steering shaft 20 through a universal joint 22, turns the pinion gear. Rotation of the pinion gear moves the toothed rack, which moves tie rods 24 (only one shown) that, in turn, move steering knuckles 26 (only one shown), which turn wheels 28 (only one shown).

EPS assist is provided through an assist unit generally designated by reference numeral 30, which includes a controller 32 and an electric motor 34. The controller 32 is powered by a vehicle power supply 36 through a supply line 38. The controller 32 receives a signal indicative of the vehicle velocity on signal line 40. Steering pinion gear angle is measured by position sensor 42 and fed to the controller 32 through line 44. Position sensor 42 may be an optical-encoding type of sensor, a variable resistance type of sensor, or any other suitable type of position sensor for performing the functions of position sensor 42.

As the steering wheel 16 is turned, the torque sensor 43 senses the torque applied to the steering wheel 16 by a vehicle operator. The torque sensor 43 may include a torsion bar (not shown) and a variable-resistance type of sensor (also not shown) that outputs a variable resistance signal to controller 32 through line 46 in relation to the amount of twist on the torsion bar. Although this is the currently preferable torque sensor, any other suitable torque-sensing device used with known signal processing techniques will suffice.

In response to the inputs on lines 40,44 and 46, the controller 32 sends a command signal through line 48 to the electric motor 34. The motor 34, in turn, supplies torque-assist to the steering system through a worm 50 and a worm gear 52, in order to provide a steering torque assist to the vehicle steering system in addition to a steering force exerted by the vehicle operator.

Such an EPS system is also disclosed in the co-pending United States Patent Application entitled An Encoder For A Permanent Magnet Sinusoidal Brushless Motor, Ser. No. 09/784,958, filed on the same day and assigned to the same assignee as the present application; which is incorporated herein by reference.

Figure 2:
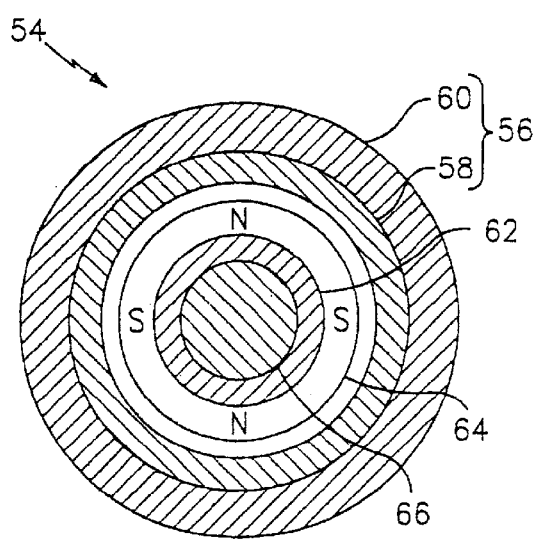
FIG. 2 illustrates a schematic cross-sectional diagram of a motor of the TRF EPS of FIG. 1.

Turning to FIG. 2, a sinusoidal motor suitable for use in the TRF EPS system of FIG. 1 may contain several new elements and materials that have not been previously combined in a motor. FIG. 2 illustrates a cross section of the sinusoidal motor generally designated by the reference numeral 54, as used in the TRF EPS system of FIG. 1. The sinusoidal motor 54 includes a new stator.56 with (a) air-gap (slot-less) winding 58, (b) composite iron yoke 60, also acting as a housing; a new rotor 62 with a high energy magnet 64, (c) sinusoidal magnetization of the magnet, (d) molded composite plastic shaft 66, and a new high-resolution position sensor (not shown) with magnetic resistor ("MR") sensing elements and steel wheels (also not shown). Such a motor is described in great detail in commonly assigned co-pending U.S. patent application Ser. No. 09/656,116, filed Sep. 6, 2000 and entitled TORQUE RIPPLE FREE ELECTRIC POWER STEERING, the disclosure of which is incorporated by reference herein in its entirety.

In order to generate motor currents with a sinusoidal shape, the inverter switching devices (e.g. MOSFETS) must be turned on and off at specific rotor angular positions. Therefore, the position of the rotor must be known at all times and an encoder is needed. This requirement is one of the factors adding to the cost of sinusoidal drives, hence traditionally limiting their application to high-performance and high-cost applications. TRF EPS is a high-performance drive that meets particular cost limitations. Therefore, a new type of encoder is disclosed that,combines high-resolution and low cost.

The two most popular ways to sense rotary position are based on optical detection and magnetic field variation. Optical encoders are temperature limited and susceptible to dirt. Semiconductor-based magnetic sensors (e.g., magnetoresistors), on the other hand, can work at higher temperatures and are starting to be used in-vehicular underhood applications.

Figure 3:
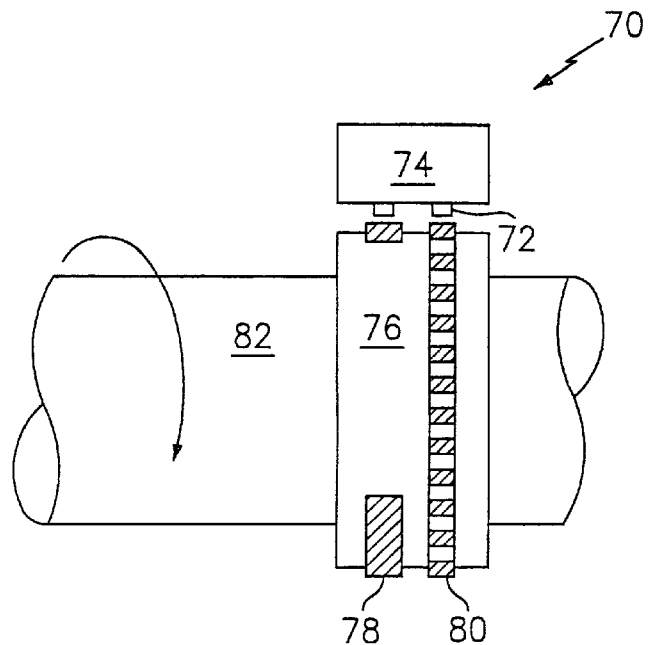
FIG. 3 illustrates an alternate embodiment sensor arrangement for a TRF EPS system.

Turning to FIG. 3, the basic idea of a position sensor usable for the passive starting method is shown, which includes a two-in-one sensor system 70 using a set of magnetoresistors ("MR") 72, or other suitable magnetic sensors, mounted on a stationary permanent magnet 74. The stationary permanent magnet 74 faces a preferably steel wheel 76 with two tracks, 78 and 80, each of which has teeth and slots on its periphery, as shown. The teeth and slots modulate the magnet's field and thus produce variations in magnetic field, hence the preference for steel though other magnetically conductive or active materials may be substituted therefore. The variations in magnetic field are sensed by the magnetoresistors 72. The several tracks 78 and 80 on the steel wheel 76 allow a sensing mechanism using the set of magnetoresistors 72 to perform several functions at the same time. The high-resolution track 80 provides two incremental signals to enable the generation of sinusoidal currents in the motor. The other track 78 provides an absolute position signal at least once every electrical cycle. This absolute signal is used for generating an index pulse or for motor commutation in order to direct the current to the appropriate phases, which are particularly important at startup. It is noted that the steel wheel 76 is mounted on a shaft 82, which is coupled to a rotor (not shown) of a motor (also not shown). It should be appreciated that the two tracks, the high-resolution track 80 and the other track 78 need not to be incorporated in a single structure as described in FIG. 3. In other words, the H1 signal 85, or its equivalent, may be generated at a location other than the location of the other track 78 as shown in FIG. 3. In fact, HI signal 85 is used for the generation of 25 an index signal 90 as will be described in FIG. 5. Also, any means that can generate a suitable index signal 90 will suffice for the purposes of the passive starting method.

Figure 4:
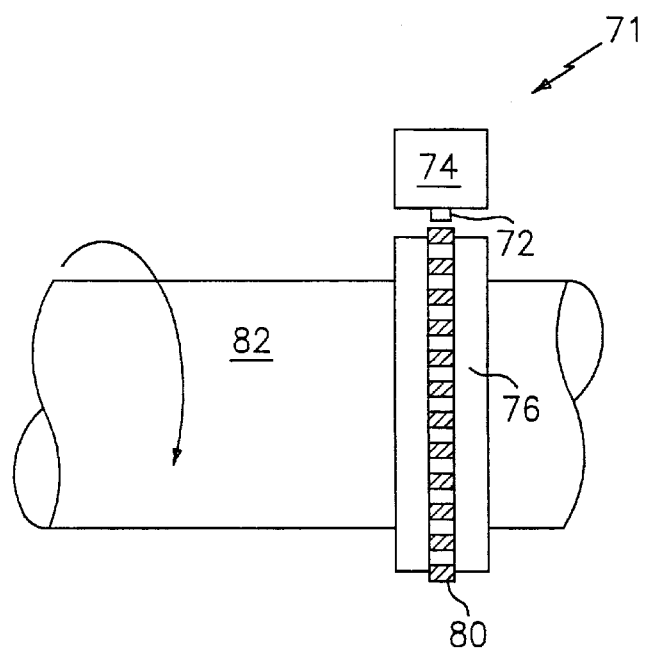
FIG. 4 illustrates a sensor arrangement for the TRF EPS system, of FIG. 1.

Therefore, referring to FIG. 4, a single sensor system 71 using a single set of magnetoresistors 72 mounted on a stationary permanent magnet 74 can also be used for the passive starting method. The stationary permanent magnet 74 faces a steel wheel 76 with a single track 80, which has teeth and slots on its periphery, as shown. The teeth and slots modulate the magnet's field and thus produce variations in magnetic field. The variations in magnetic field are sensed by the magnetoresistors 72. The single track 80 on the steel wheel 76 allows a sensing mechanism using the set of magnetoresistors 72 to perform several functions at the same time. The single track 80 is a high-resolution track that provides two incremental signals to enable the generation of sinusoidal currents in the motor. The index pulse is then produced by some means such as by building the high resolution track 80 in such a way that one of the incremental pulses look different, once per revolution. It is noted that the steel wheel 76 is mounted on a shaft that is coupled to a rotor (not shown) of a motor (also not shown). As may be understood by comparing FIG. 4 to FIG. 3, the dimension of the stationary permanent magnet 74, which constitutes a substantial portion of a sensor system, is reduced to about half the volume in FIG. 4 as compared to FIG. 3. This reduction in dimension is significant because the reduction in size of the stationary permanent magnet 74 results in a concomitant and desirable savings in cost.

An encoder for a TRF EPS system has high resolution while keeping the sensor simple enough for economical production. The more teeth there are on the wheel periphery, the higher the resolution will be. There is, however, a practical limit to increasing the number of teeth. This limit is caused in part by the difficulty in locating the magnet very much closer than 1.5 mm away from the target wheel, in order to allow for the MR thickness and protective layers on both the magnet and the MR surface, and to provide some clearance between the sensor and the target. If the features on the wheel periphery are much smaller than the gap between the magnet and the wheel, the magnetic field modulation is insignificant and the signal generated may be too small to be useful. The sensor resolution is therefore proportional to the sensor wheel diameter. In this particular application, a single MR would provide approximately 4 mechanical degrees of resolution, which is considered insufficient. Therefore, several MRs are used to generate additional signals and to thereby increase the resolution to a satisfactory level.

Figure 5:
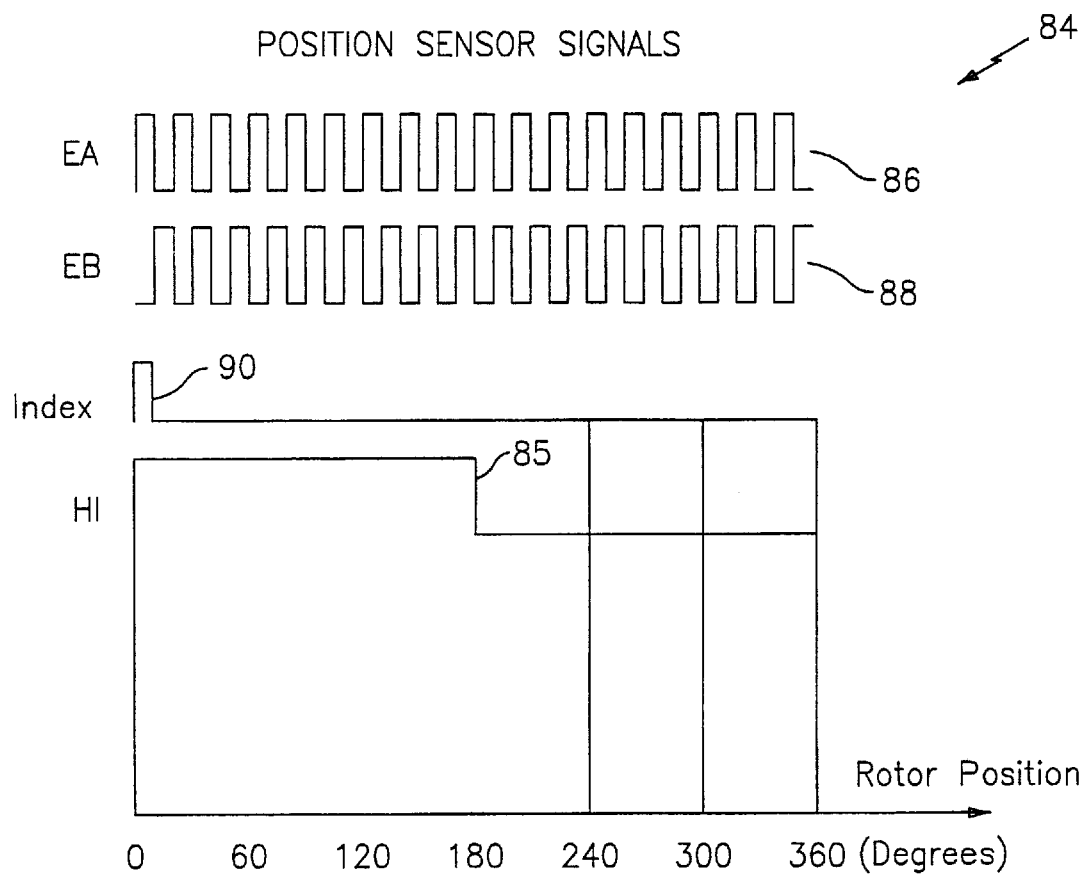
FIG. 5 illustrates a set of encoder signals for the TRF EPS system of FIG. 1.

The starting procedure for the EPS system, based upon a single commutation sensor for generating the index signal, is as follows: Upon power-up of the EPS system, the single commutation signal H1 85 is sampled to determine an initial EPS system motor rotor position. FIG. 5 illustrates a set of encoder signals for the sinusoidal EPS system. The numeral 84 designates the set of encoder signals. Periodical signals EA 86 and EB 88 are high-resolution quadrature pulse-trains. The pulse-trains are used to determine the EPS motor rotating direction as well as to determine the increment of the EPS motor rotator position count. An index signal 90 is a pulse indicating a predefined, usually zero, EPS motor rotor position that is used for resetting the EPS motor rotator position count. This index signal 90 is generated in response to the single commutation signal H1 85. The method of generating the index signal 90 from the H1 signal 85 includes using a hardware circuit and/or software to sample and process the transients in the H1 signal. In case of not using a commutation signal, the index signal can be an independent signal produced by a separate sensor and track, or contained in the incremental signals 86 and 88 by building the high resolution track 80 in such a way that one of the incremental pulses looks different once per revolution.

Figure 6:
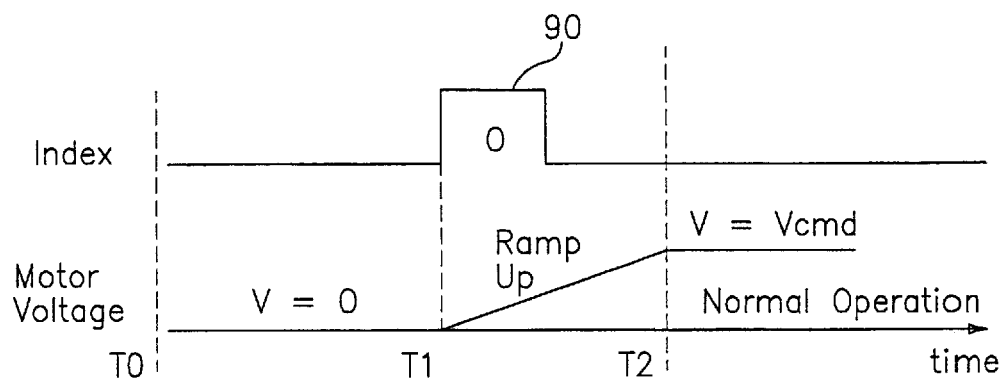
FIG. 6, illustrates passive starting for TRF EPS system of FIG. 1.

Referring to FIG. 6, a passive starting process for a TRF EPS system is shown. Time-mark T0 represents the instant that electric power is supplied to the EPS system. The EPS system starts off as being inactive or disabled, in that a motor voltage is zero from time T0 to immediately before T1. During this period, the EPS system will not provide any torque assist to the driver's steering, and is waiting for the driver to steer manually to move the motor across the index position. At time T1, the EPS system encounters, for the first time, the index pulse 90, and immediately enables torque assist for the vehicle operator. To avoid any abrupt transients in assist torque, the EPS system starts ramping during the time interval T1 to T2. After T2, the motor voltage reaches a normal operation voltage, $V_{cmd}$. In other words, the TRF EPS starting method is a passive starting strategy for the sinusoidal EPS system. The EPS system does not require the use of all commutation sensors for starting the motor. The need to seek any assisted torque from the motor is disabled for an initial steering wheel movement. The passive starting strategy relies fully on the vehicle operator's efforts in turning the steering wheel 16, which is coupled to the EPS motor, to thereby turn the motor rotor to the index position during a power-up initialization stage. In other words, the EPS motor controller 32 provides zero assist torque until the first index pulse is encountered. Upon encountering the first index pulse, the controller 32 ramps the assist torque to a desired level. Normal operation of the EPS system ensues. For example, a prototype sinusoidal EPS system with an index pulse for every electrical cycle which is 120 mechanical degrees and with a gear ratio of more than 20:1 between a motor shaft and a steering wheel column. Upon power-up, the worst-case scenario is that the first six degrees of steering wheel movement will receive zero assist torque.

It can be appreciated that the elimination of at least two commutation tracks reduces the dimension, as well as the cost of an encoder. Since the encoder cost is a major concern for the sinusoidal EPS system, the instant TRF EPS system and method gives the sinusoidal EPS system a marketable competitive edge.

Figure 7:
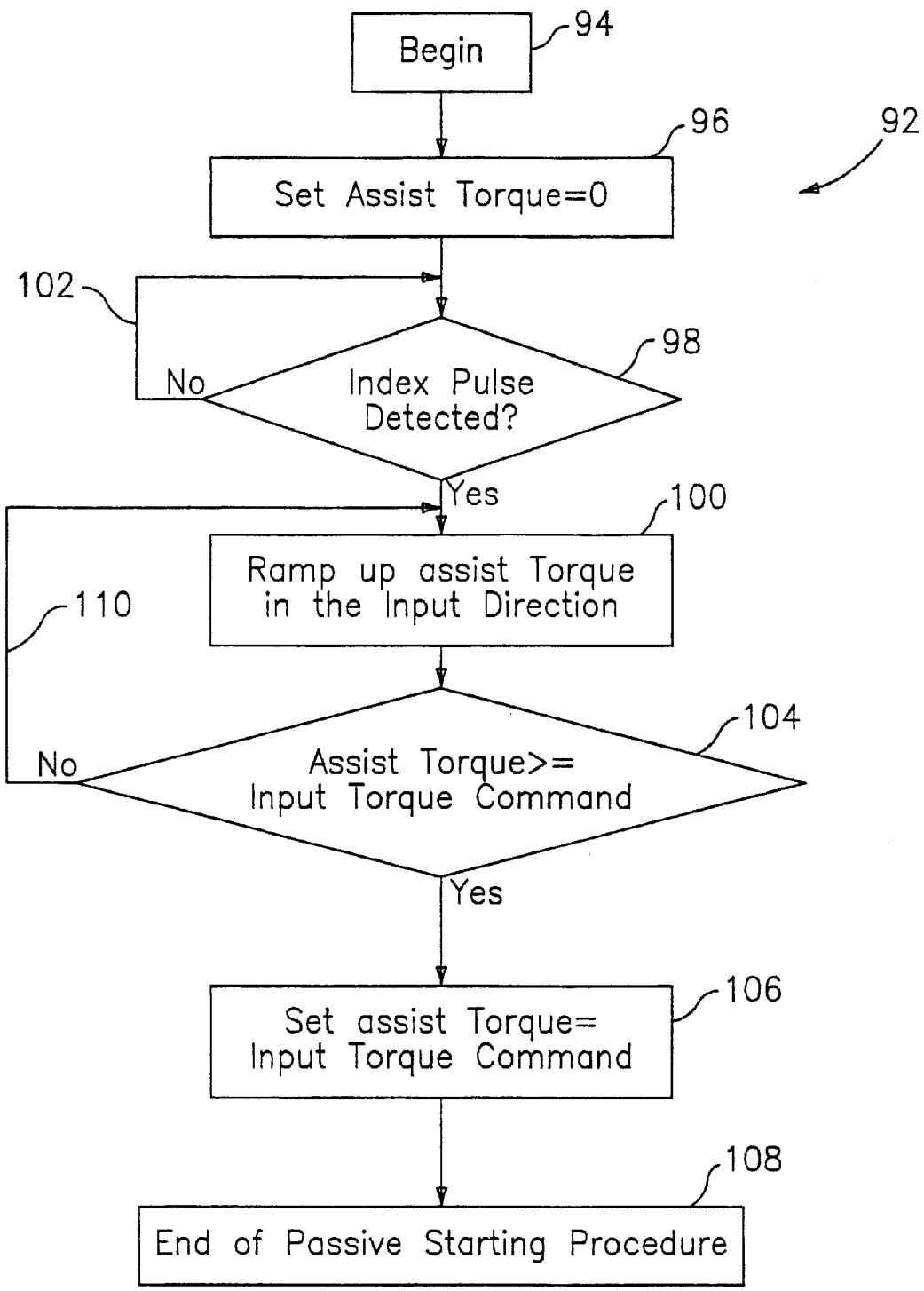
FIG. 7 illustrates a flow-chart for passive starting of the TRF EPS system of FIG. 1.

Referring to FIG. 7, a passive starting flow-chart that is implemented in the sinusoidal EPS system is shown. The passive starting flow-chart is generally indicated by the reference numeral 92. The flow-chart 92 starts at box 94. Once a start-up is detected, an EPS assist torque is set to zero at 96. If an index pulse 90 is detected at decision block 98, the controller 32 then enables assist torque from the EPS system or ramps the assist torque toward normal operating-mode 100. If no-index pulse 90 is detected, the flow-chart flows back along line 102 to the start of decision block 98 and waits until index pulse 90 is detected. At decision block 104, the assist torque is compared with an input torque command such as a derivative of a torque exerted upon the steering wheel 16 by a vehicle operator and transmitted to the steering shaft 18. Once the assist torque is equal or greater than that of the input torque command, the assist torque is set to be equal to the input torque command at block 106. At this juncture, normal operation of the EPS system commences, and the instant passive starting procedure ends at block 108. However, if at decision block 104, the assist torque is less than that of the input torque command, the flow-chart flows back along line 110 to the beginning of block 100 and ramping of assist torque continues. For example, see FIG. 6 within the time segment of T1 to T2.

The above flow-chart may be incorporated into a process wherein the process can be added to the existing EPS motor control process. Thus, the torque command may be modified. In other words, upon power-up, the assist torque is set to zero. Once the index pulse 90 is detected, the process ramps the assist torque until it reaches the desired value. The EPS system then enters into the normal operation with precise position information.

The passive starting process or method assumes that the index pulse signal 90 is generated without utilizing all three commutation signals, H1, H2 and B3. However, the index pulse 90 may be derived from one of the commutation signals, such as for example, Hl. If so, at least one commutation sensor has to remain for the generation of the index pulse 90. It follows that the single commutation sensor may be used to provide an estimation of the EPS system motor rotor initial position. But the error in this estimation is ±90 degrees. This might produce a possible motor torque against the driver's steering effort. Therefore, an assist torque based on such position estimation is generally unsatisfactory for position estimation purposes in a TRF EPS system.

The TRF EPS passive starting strategy contemplates detection of an index pulse. Upon the detection of the index pulse, a ramping of a variable-assist torque ensues. The variable-assist torque is then compared with a variable-input torque command. The variable-assist torque preferably converges to the variable-input torque command.

The method for passively starting an EPS system may be implemented without the use of commutation signals, or with only one commutation signal if no index pulse is available separately. The method includes detecting an index pulse. Upon the detection of the index pulse, the absolute position of the EPS motor will be obtained and assist torque will be generated by the EPS system. To avoid any abrupt torque transients, a ramping of a variable assist torque ensues. The variable assist torque is then compared with a variable input torque command. The variable assist torque is then set to equal to the variable input torque command.

It is preferable to use the instant passive starting method without using any commutation signals. The index pulse or signal 90 need not be derived from a commutation signal.

This method substantially reduces the need for commutation signals for a determination of an initial rotor position. It should be appreciated that the method may utilize only two quadrature incremental pulses and an index pulse in order to accomplish a desirable result. The index pulse can be obtained by processing a single commutation signal.

Although the method is intended for application to EPS systems, it may also be applied to any motor that requires a starting process wherein a position of a rotor needs to be determined.

Passive starting of a TRF EPS system can be embodied in the form of computer-implemented processes and apparatuses for practicing those processes. Passive starting of a TRF EPS system can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the disclosed method. Passive starting of a TRF EPS system can also be embodied in the form of computer program code, for example, whether stored in a storage medium, loaded into or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the disclosed method. When implemented on a general-purpose microprocessor, the computer program code segments configure the microprocessor to create specific logic circuits.

It will be understood by one of ordinary skill in the pertinent art that modifications may be made to the exemplary embodiments disclosed herein without departing from the true scope and spirit of the invention. While the present method and apparatus have been described by means of example, the described exemplary embodiments are not intended to limit the claims to subject matter narrower than all equivalent embodiments falling within the true scope and spirit of this disclosure.

What is claimed is:

1. A method for passively starting an electric power steering system, comprising:
   disabling assist torque upon power-up;
   detecting an index pulse;
   enabling assist torque upon detecting the index pulse;
   receiving a variable input torque command; and
   ramping a variable assist torque towards the variable input torque command after enabling assist torque.

2. The method of claim 1, further comprising:
   comparing the variable assist torque with the variable input torque command; and
   setting the variable assist torque in correspondence with the variable input torque command.

3. The method of claim 1 wherein the variable input torque command is indicative of a torque exerted by a vehicle operator upon a steering wheel.

4. The method of claim 2, further comprising:
   continuing to ramp the variable assist torque upon comparing the variable assist torque with a substantially unequal variable input torque command.

5. The method of claim 2, further comprising:
   achieving a normal operating mode of the electric power steering system after setting the variable assist torque equal to the variable input torque command.

6. The method of claim 1 wherein the ramping of the variable assist torque comprises:
   raising a motor voltage from a lower value up toward a normal operating voltage value for the electric power steering system.

7. An electric power steering system, comprising:
   a steering wheel coupled to a steering column;
   a motor coupled to the steering column;
   an encoder coupled to the motor, the encoder comprising at least one track and a set of sensors for sensing the at least one track to generate a set of signals; and
   a controller coupled in signal communication between the encoder and the motor for receiving the set of signals from the encoder and controlling the motor in correspondence with a method for passively starting the electric power steering system, the controller comprising:
   an index pulse,detector;
   an enabler responsive to the index pulse detector for enabling an amplifier; and
   an amplifier for ramping the variable assist torque in correspondence with a variable input torque command.

8. The electric power steering system of claim 7 wherein the at least one track comprises two tracks.

9. The electric power steering system of claim 7 wherein the encoder comprises a steel wheel having a track for generating an index pulse once per revolution.

10. The electric power steering system of claim 7 wherein the variable input torque command is derived from a variable torque originating from a torque exerted by a vehicle operator upon the steering wheel.

11. The electric power steering system of claim 7 wherein the controller further comprises a comparator for continuing to ramp the variable assist torque while the variable assist torque is unequal to the variable input torque command.

12. The electric power steering system of claim 7 wherein the controller further comprises a comparator for achieving a normal operating mode of the electric power steering system after setting the variable assist torque substantially equal to the variable input torque command.

13. The electric power steering system of claim 7 wherein the amplifier for ramping the variable assist torque further comprises an adjuster for adjusting a motor voltage from a lower value up toward a normal operating voltage value for the electric power steering system.

14. A storage medium encoded with machine-readable computer program code for an electric power steering system, the storage medium including instructions for causing a computer to implement a method comprising:
   detecting an index pulse;
   ramping a variable assist torque upon detecting the index pulse;

comparing the variable assist torque with a variable input torque command; and setting the variable assist torque substantially equal to the variable input torque command.

15. The storage medium of claim 14 wherein the variable input torque command is derived from a variable torque originating from a torque exerted by a vehicle operator upon a steering wheel.

16. The storage medium of claim 14 further comprising instructions for causing a computer to implement a continued ramping of the variable assist torque upon detecting the variable assist torque to be less than the variable input torque command.

17. The storage medium of claim 14 further comprising instructions for causing a computer to implement proceeding toward normal operations of the electric power steering system after setting the variable assist torque equal to the variable input torque command.

18. The storage medium of claim 14 further comprising instructions for causing a computer to implement transitioning a motor voltage from a lower value toward a normal operating voltage value for the electric power steering system.

* * * * *